United States Patent
Dupaquis et al.

(10) Patent No.: US 8,233,620 B2
(45) Date of Patent: Jul. 31, 2012

(54) KEY RECOVERY MECHANISM FOR CRYPTOGRAPHIC SYSTEMS

(75) Inventors: Vincent Dupaquis, Biver (FR); Michel Douguet, Marseilles (FR)

(73) Assignee: Inside Secure, Aix-en-Provence (FR)

( * ) Notice: Subject to any disclaimer, the term of this patent is extended or adjusted under 35 U.S.C. 154(b) by 476 days.

(21) Appl. No.: 12/395,504

(22) Filed: Feb. 27, 2009

(65) Prior Publication Data
US 2010/0220863 A1   Sep. 2, 2010

(51) Int. Cl.
*H04L 9/28* (2006.01)
(52) U.S. Cl. ........... 380/37; 380/28; 380/29; 380/44; 380/277
(58) Field of Classification Search .......... 380/37, 380/29, 277, 28, 40
See application file for complete search history.

(56) References Cited

U.S. PATENT DOCUMENTS

| | | | |
|---|---|---|---|
| 7,221,763 B2 | 5/2007 | Verbauwhede | |
| 7,257,229 B1* | 8/2007 | Leshem | 380/277 |
| 7,295,671 B2 | 11/2007 | Snell | |
| 2002/0131588 A1 | 9/2002 | Yang | |
| 2003/0223580 A1* | 12/2003 | Snell | 380/28 |
| 2004/0047466 A1 | 3/2004 | Feldman et al. | |
| 2004/0208318 A1* | 10/2004 | Henry et al. | 380/46 |
| 2008/0019524 A1 | 1/2008 | Kim et al. | |
| 2008/0031454 A1 | 2/2008 | Verbauwhede | |
| 2008/0101599 A1* | 5/2008 | Yang | 380/44 |
| 2008/0137866 A1 | 6/2008 | Yang | |
| 2008/0159526 A1 | 7/2008 | Gueron et al. | |
| 2008/0192928 A1 | 8/2008 | Yu et al. | |
| 2008/0240426 A1 | 10/2008 | Gueron et al. | |
| 2010/0014664 A1* | 1/2010 | Shirai et al. | 380/44 |

FOREIGN PATENT DOCUMENTS

| | | |
|---|---|---|
| EP | 1895708 | 3/2008 |
| JP | 8 008897 | 1/1996 |
| WO | WO 02/101979 | 12/2002 |

OTHER PUBLICATIONS

Kim, M., et al., "Low Power Circuit Architecture of AES Crypto Module for Wireless Sensor Network", Proceedings of World Academy of Science, Engineering and Technology, vol. 8, 2005, 5 pages.

Daemen et al., "Preliminaries of the Design of Rijndael", *Information Security and Cryptography*, Springer Verlag, DE, (Jan. 1, 2002), pp. 9-29.

European Authorized Officer, Manet, Pascal, International Search Report and Written Opinion for PCT/US2010/025443 dated Nov. 16, 2010, 14 pages.

Authorized Officer Athina Nickitas-Etienne, International Preliminary Report and Written Opinion for Application No. PCT/US2010/025443, dated Sep. 9, 2011, 7 pages.

* cited by examiner

*Primary Examiner* — Yin-Chen Shaw
(74) *Attorney, Agent, or Firm* — Fish & Richardson P.C.

(57) ABSTRACT

A cryptographic system can include a register containing a key and a processor coupled to the register. The processor can be operable for performing a first encrypting operation, where the encrypting operation includes computing a key schedule using the register as a workspace. At the end of the first encrypting operation, the key is recovered from the register for use in a second encrypting operation.

22 Claims, 8 Drawing Sheets

350

| 354<br>AES operation | 352<br>Execution time (in CPU cycles) |
|---|---|
| AES-128 Encryption without key recovery | 71 cycles |
| AES-128 Encryption with key recovery | 92 cycles |
| AES-192 Encryption without key recovery | 85 cycles |
| AES-192 Encryption with key recovery | 102 cycles |
| AES-256 Encryption without key recovery | 99 cycles |
| AES-256 Encryption with key recovery | 121 cycles |
| AES-128 Decryption without key recovery | 71 cycles |
| AES-128 Decryption with key recovery | 92 cycles |
| AES-192 Decryption without key recovery | 85 cycles |
| AES-192 Decryption with key recovery | 102 cycles |
| AES-256 Decryption without key recovery | 99 cycles |
| AES-256 Decryption with key recovery | 121 cycles |
| AES-128 Key schedule | 21 cycles |
| AES-192 Key schedule | 17 cycles |
| AES-256 Key schedule | 22 cycles |
| AES-128 Key CRC Computation | 16 cycles |
| AES-192 Key CRC Computation | 24 cycles |
| AES-256 Key CRC Computation | 32 cycles |

FIG. 3B

KEY RECOVERY MECHANISM FOR CRYPTOGRAPHIC SYSTEMS

TECHNICAL FIELD

The subject matter of this application is generally related to cryptographic systems.

BACKGROUND

The Advanced Encryption Standard (AES) is a National Institute of Standards and Technology specification for a cryptographic algorithm that can protect electronic data used in symmetric key cryptography. The AES algorithm can encrypt (encipher) and decrypt (decipher) information that is in the form of electronic data. Encryption converts the electronic data to an unintelligible form called ciphertext; decrypting the ciphertext converts the electronic data back into its original form, called plaintext. The AES algorithm is an iterative, symmetric-key block cipher that is capable of using cryptographic keys of 128, 192, and 256 bits to encrypt and decrypt electronic data in blocks of 128 bits.

Public-key ciphers can use a pair of cryptographic keys. However, the AES algorithm uses the same cryptographic key to encrypt and decrypt electronic data. The AES algorithm is a block cipher. Encrypted data returned by block ciphers can have the same number of bits as the input data. The AES algorithm performs its ciphers on blocks of data, making it an iterative cipher. Iterative ciphers can use a loop structure that repeatedly performs permutations and substitutions of the input data.

Each block of data ciphered uses the same cryptographic key to encrypt or decrypt the data. The AES algorithm encrypts or decrypts data in 128 bit blocks. Each encryption or decryption of the 128 bit block of data by the AES algorithm can use a plurality of AES operations. The encryption or decryption of a 128 bit block of data using a plurality of AES operations where a group of successive operations performed iteratively can be referred to as a round. The AES algorithm also takes the cryptographic key and performs a key expansion to generate a key schedule for use in the AES encryption algorithm. Alternatively, in a decryption of a 128 bit block of data, the AES algorithm starts with the scheduled key and performs an inverse key schedule operation to generate the cryptographic key used in the encryption in order to decrypt the data in the 128 bit block.

Each encryption of a 128 bit block of data requires the cryptographic key as input along with a 128 bit block of input data. The input electronic data for encryption that is larger than 128 bits can be divided into a multiple of 128 bit blocks. Each 128 bit block can be encrypted using the AES algorithm. The AES algorithm takes the cryptographic key and performs a key expansion routine to generate a key schedule, transforming the original cryptographic key.

Each decryption of a 128 bit block of data requires the scheduled key as input along with a 128 bit block of input data. The input electronic data for decryption that is larger than 128 bits can be divided into a multiple of 128 bit blocks. Each 128 bit block can be decrypted using the AES algorithm. The AES algorithm can invert and perform in reverse order the AES operations used for encryption. The AES algorithm takes the scheduled key and performs an inverse key schedule operation to determine the original cryptographic key used for encryption.

Conventional cryptographic systems save the key needed for encryption or the key schedule needed for decryption in a buffer that is separate from the workspace buffer used by the AES algorithm during the encryption or decryption operation. Prior to each 128 bit block encryption or decryption, the system restores the key or scheduled key, respectively, from the separate buffer. Alternatively, some conventional cryptographic systems provide the key or scheduled key to a cipher engine performing the encryption or decryption, respectively, for each 128 bit block of data that is encrypted or decrypted. This can result in additional handling and manipulation of the cryptographic key or key schedule. This additional handling and manipulation may compromise the secrecy of the key and its schedule.

SUMMARY

In some implementations, a cryptographic system can perform a key recovery operation. In the case of encryption, at the end of encrypting a 128 bit block of data, the system can perform an inverse key schedule operation on the scheduled key used for encryption to recover the original cryptographic key. This key can be placed in the key buffer for use in the next encryption process. In the case of decryption, at the end of decrypting a 128 bit block of data, the system can perform a key schedule operation on the cryptographic key used for decryption to recover the key schedule.

Performing a key recovery operation during a cipher operation can eliminate the need for a cipher engine to maintain a copy of the key or key schedule for encryption or decryption, respectively. Additionally, it can eliminate unnecessary handling and manipulation of the key and key schedule. In the case of an encryption, the cryptographic system does not need to reload the key into the cipher engine for each 128 bit block of data for encryption. In the case of decryption, the cryptographic system does not need to reload the key schedule into the cipher engine for each 128 bit block of data for decryption.

DESCRIPTION OF DRAWINGS

FIG. 3B is a table showing the execution times for Advanced Encryption Standard (AES) operations selected using the AES operation register.

DETAILED DESCRIPTION

Implementation of an AES Cipher Engine

Figure 1:
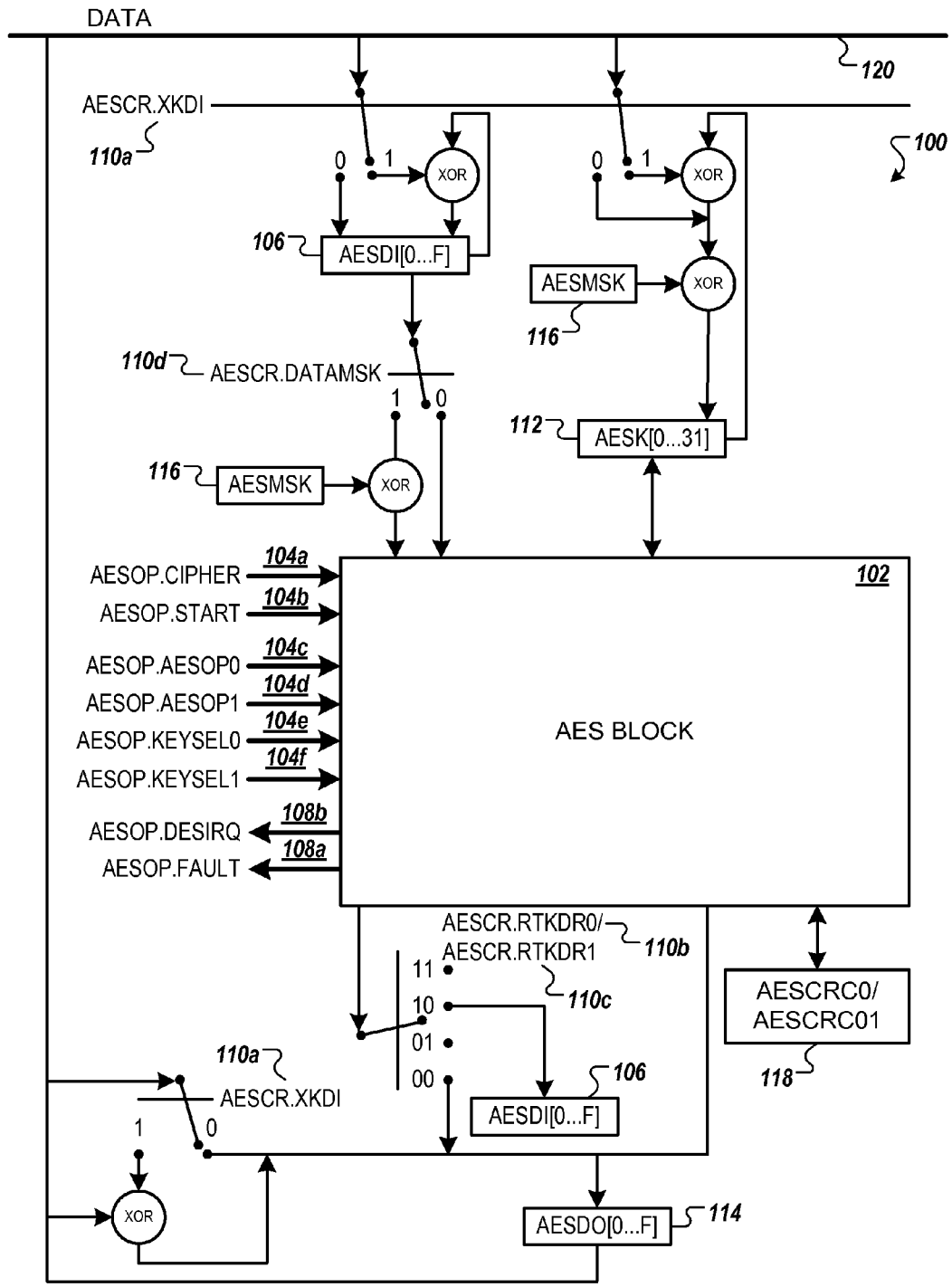
FIG. 1 is a block diagram of an example implementation of an Advanced Encryption Standard (AES) cipher engine.

FIG. 1 is a block diagram of an example implementation of an Advanced Encryption Standard (AES) cipher engine 100. The engine 100 can perform an AES calculation that can include AES encryption and decryption operations on blocks of electronic data generating cipher text and plaintext, respectively. The engine 100 can be included in a cryptographic system.

As shown in FIG. 1, the engine 100 includes registers that can provide input to an AES block 102 that can enable and control AES encryption and decryption operations performed by the AES block 102. Registers can provide the data (e.g., ciphertext or plain text) for the AES operations. Registers can provide the cryptographic key data for use in the AES encryption and decryption operations. Additionally, registers can provide result and status information related to the AES operations performed by the AES block 102. Registers can provide the resultant data (e.g., ciphertext or plain text) of the AES operations. Unless otherwise indicated, the registers contain eight bit (one byte) values. The specific registers, their values and functions will be described in more detail below.

An AES ON bit in a power management control register included in the cryptographic system can control the enabling of the AES cipher engine 100. When the AES ON bit is set equal to zero, the cryptographic system can shut down the engine 100 minimizing the engine's current consumption and placing the engine 100 in a power-down mode. During the power-down mode, the values contained in the registers of the engine 100 are not available for reading or writing. The exception to this is an AES mask register 116. The cryptographic system can read the AES mask register 116, which can contain the version number of the AES cipher engine 100. Additionally, the contents of the majority of the registers included in the engine 100 can be maintained during the power-down mode. Setting the AES ON bit equal to one powers up and enables the engine 100 placing it into a computation mode. Powering up the engine 100 increases its current consumption. The engine 100 can perform AES calculations using AES operations. The use of the AES ON bit can minimize power consumption in a cryptographic system that includes the AES cipher engine 100 by powering down the engine 100 when it is not in use.

An AES operation register (AESOP) can include six bits 104a-f that can be input to the AES block 102. The six bits 104a-f can select the cipher-type (encryption or decryption), the key schedule, and the number of bits contained in the cryptographic key used in the AES operations. An AES start bit 104b (AESOP.START), when set equal to one, can start the requested cipher operations (encryption or decryption) in the AES block 102. When the AES block 102 completes the requested cipher (encryption or decryption) the AES start bit 104b is cleared (set equal to zero). An AES cipher bit 104a (AESOP.CIPHER) can be an encryption direction (or cipher-type selection) bit. Setting the AES cipher bit 104a equal to one informs the AES block 102 that it is to perform an AES encryption. Setting the AES cipher bit 104a equal to zero informs the AES block 102 that it is to perform an AES decryption.

AES key select bits 104e, 104f (AESOP.KEYSEL0 and AESOP.KEYSEL1, respectively) can select one of three possible input sizes for an input cryptographic key: 128, 192, or 256 bits. The AES block 102 can use the cryptographic key for AES operations. The AES key select bits 104e, 104f are set prior to setting the AES start bit 104b equal to one, which starts the AES operations. Changes made to the AES key select bits 104e, 104f while the AES start bit 104b is equal to one causes a fault condition to occur in the AES block 102. The AES block 102 indicates a fault occurred by clearing (setting equal to zero) the AES start bit 104b and setting an AES status register fault detection bit 108a equal to one. AES input data registers 106 (AESDI[0 . . . F]), AES output data registers 114 (AESDO[0 . . . F]) and AES key registers 112 (AESK[0 . . . 31]) remain unchanged. These registers will be described in more detail below.

AES operation bits 104c, 104d (AESOP.AESOP0 and AESOP.AESOP1, respectively) can select one of a possible four AES operations to launch when the AES start bit 104b is set equal to one. Clearing (setting equal to zero) both AES operation bits 104c, 104d selects no key recovery for the selected cipher operation determined by the value of the cipher bit 104a. Setting both AES operation bits 104c, 104d equal to one selects a cyclic redundancy check (CRC) key computation to verify the integrity of the input cryptographic key. Clearing (setting equal to zero) the AES operation bit 104c and setting the AES operation bit 104d equal to one selects key recovery for the selected cipher operation determined by the value of the cipher bit 104a. Setting the AES operation bit 104c equal to one and clearing (setting equal to zero) the AES operation bit 104d selects an AES key schedule operation. The use of the AES operation register to set up and start AES operations will be described in more detail with reference to FIG. 3.

A cryptographic system can set or clear bits of an AES control register (AESCR) that can include four bits 110a-110d, to control aspects of the AES operations performed in the AES block 102. Setting an XOR key data input bit 110a (AESCR.XKDI) equal to one allows exclusive-ORing (XORing) of input data written to a selected input data register (e.g., AES input data registers 106 (AESDI[0 . . . 15])) with the data already contained in the register. Clearing (setting equal to zero) the XOR key data input bit 110a allows the AES cipher engine 100 to directly write data to a selected input data register (e.g., AES input data registers 106) overwriting any previous data contained in the data register.

Setting the XOR key data input bit 110a equal to one can also allow exclusive-ORing (XORing) of input data written to a selected key register (e.g., key registers 112 (AESK[0 . . . 31])) with the data already contained in the key register. Clearing (setting equal to zero) the XOR key data input bit 110a allows the AES cipher engine 100 to directly write data to a selected key register (e.g., key registers 112) overwriting any previous data contained in the key register.

In some implementations, the cryptographic system may set the XOR key data input bit 110a equal to one when implementing AES based Cipher Block Chaining Message Authentication Code (CBC-MAC) algorithms.

The setting or clearing of the XOR key data input bit 110a could occur prior to or simultaneously with the setting of the AES start bit 104b equal to one, which initiates the cipher operations. The XOR key data input bit 110a may not be written during AES calculations (starting with after setting the AES start bit 104b equal to one to the end of the AES calculations).

Result to key data register bits 110b and 110c (AESCR.RTKDR0 and AESCR.RTKDR1, respectively) can determine where the result of an AES block operation is stored. In the implementation shown in FIG. 1, result to key data register bit 110b is cleared (set equal to zero). Setting the result to key data register bit 110c equal to one when the result to key data register bit 110b is cleared (set equal to zero) stores the result of an AES block operation performed in the AES block 102 in the output data registers 114 (AESDO[0 . . . 15]) and the input data registers 106. Clearing (setting equal to zero) the result to key data register bit 110c while keeping the result to key data register bit 110b cleared stores the result of an AES block operation performed in the AES block 102 in the output data registers 114.

The setting or clearing of the result to key data register bits 110*b* and 110*c* could occur simultaneously with setting the AES start bit 104*b* equal to one. Setting or clearing the result to key data register bits 110*b* and 110*c* when the AES start bit 104*b* is already set equal to one can cause the a fault condition to occur in the AES block 102. The AES block 102 indicates a fault occurred by clearing (setting equal to zero) the AES start bit 104*b* and setting the AES status register fault detection bit 108*a* equal to one. The AES input data registers 106 (AESDI[0 . . . F]), the AES output data registers 114 (AESDO[0 . . . F]) and the AES key registers 112 (AESK [0 . . . 31]) remain unchanged.

AES data mask enable bit 110*d* (AESCR.DATAMSK) controls a data masking feature in the AES cipher engine 100. Setting the AES data mask enable bit 110*d* equal to one enables the data mask feature. Clearing (setting equal to zero) the AES data mask enable bit 110*d* disables the data mask feature. When enabled, the data mask feature can mask the input data for encryption or decryption contained in the AES input data registers 106 with the content of an AES mask register 116 (AESMSK). This will be described in more detail below.

The AES cipher engine 100 can include AES CRC registers 118 (AESCRC0 and AESCRC1) that, when combined, contain a 16 bit result of a cyclic redundancy check (CRC) performed on the input cryptographic key used for AES operations. The engine 100 can perform the CRC check on input cryptographic keys of 128, 192, and 256 bits. The AES block 102 can use the result of the CRC performed on the key to detect any data corruption of the key prior to its use in any AES operations.

The AES cipher engine 100 can include an AES mask register 116 (AESMSK) that can contain a one byte (eight bit) mask value. The cryptographic system loads the mask register 116 with a one byte mask value. Prior to the start of AES operations, the engine 100 can mask the input cryptographic key data with the mask register 116 on a byte per byte basis. Simultaneous with the start of AES operations, the engine 100 can also mask the input data for encryption or decryption with the mask register on a byte by byte basis.

The AES cipher engine 100 can mask the contents of the mask register 116 on a byte by byte basis with the value of the input cryptographic key by exclusive-ORing (XORing) the value in the mask register 116 with each byte of the key. The engine 100 can write the resultant masked key into key registers 112. The key masking can occur prior to the start of any AES operations. Masking of the input cryptographic key in the manner just described can occur if the XOR key data input bit 110*a* is cleared (set equal to zero). Setting the XOR key data input bit 110*a* equal to one allows exclusive-ORing (XORing) of an input key data written to key registers 112 with the data already contained in the key registers 112.

In some implementations, the AES cipher engine 100 can perform a cryptographic key CRC computation. The input cryptographic key data can be exclusive-ORed (XORed) on a byte per byte basis with the content of the mask register 116. The engine 100 can write the resultant XORed key bytes to the key registers 112. The key registers 112 can be input to an AES CRC computation engine (e.g., included in the AES block 102). The CRC computation engine can perform a CRC computation using a value contained in the AES CRC registers 118 as an initial value for use in the CRC calculation.

If the AES data mask enable bit 110*d* in the AES mask register 116 is set equal to one at the start of AES operations, the AES cipher engine 100 can mask the mask register 116 with each of the input data registers 106. The AES cipher engine 100 can perform the masking by exclusive-ORing (XORing) the value in the mask register 116 with the value in the input data register. The AES block 102 can receive the resultant masked input data registers.

When the AES ON bit is set equal to zero, the AES cipher engine 100 can be placed in a shut down mode. In this mode, the cryptographic system can read the AES mask register 116 that can contain the version number of the engine 100. The cryptographic system can read the mask register 116 and determine the version number of the engine 100 included in the system.

The AES output data registers 114 (AESDO[0 . . . F]) can be sixteen eight bit (one byte) registers that contain the result of an AES calculation performed by the AES block 102 in the AES cipher engine 100. The AES input data registers 106 (AESDI[0 . . . F]) can be sixteen eight bit (one byte) registers that contain the input data for encryption or decryption used in the AES calculation performed by the AES block 102 in the AES cipher engine 100. The cryptographic system loads, from data bus 120, the input data registers 106 with input data for encryption or decryption prior to initiating the start of the AES operations in the engine 100. As previously described, masking operations can also be conditionally performed on the input data contained in the input data registers 106 prior to initiating the start of the AES operations.

The AES key registers 112 (AESK[0 . . . 31]) can be 32 eight bit (one byte) registers that contain the cryptographic key value for use in the AES calculation performed by the AES block 102 in the AES cipher engine 100. The cryptographic system loads, for the data bus 120, the key registers 112 with a cryptographic key that can be 128, 192, or 256 bits (16 bytes, 24 bytes or 32 bytes, respectively). As previously described, masking operations can also be selectively performed on the key registers 112.

The cryptographic system can read the bits of an AES status register (AESSR) to determine status information related to the AES cipher engine 100 and status information related to the AES operations performed by the AES block 102. An AES interrupt flag bit 108*b* (AESSR.AESIRQ) can be set equal to one when the AES block 102 has completed the AES calculation. If additional register bits included in the cryptographic system are appropriately set, setting the interrupt flag bit 108*b* can cause the generation of an interrupt in the cryptographic system.

The fault detection bit 108*a* (AESSR.FAULT), when set equal to one, indicates a problem occurred while the AES block 102 was executing an AES operation. In some implementations, the AES block 102 can detect the problem by comparing its internal states with the requested operation.

For example, the AES block 102 can set the fault detection bit 108*a* equal to one when the AES block 102 receives an invalid request. In another example, the AES block 102 can internally check the consistency of its operations and can set the fault detection bit 108*a* equal to one when an inconsistency occurs. In an alternate example, the AES block 102 can count the number of AES rounds it performs on a block of input data. The AES block 102 can determine the number of rounds that the AES block should perform on a 128 bit block of data as the number of rounds is based on the size of the key used in the AES operations (e.g., an AES cipher using a 128 bit key performs 10 rounds on a 128 bit block of data). If the actual number of rounds is different from the calculated number of rounds, the AES block 102 can set the fault detection bit 108*a* equal to one.

If during an AES calculation by the AES block 102 a fault occurs, the fault detection bit 108*a* is set equal to one by the AES block 102 at the end of the AES calculation simultaneous with setting the interrupt flag bit 108*b* equal to one. In some cases, the AES block 102 detecting a fault during an AES calculation can result in the AES block 102 continuing an erroneous AES calculation. For example, the AES block 102 may use a corrupt key or the output data of the AES block 102 resulting from the AES calculation may be corrupted. In some cases, the AES block 102 may prepare the setting of the fault detection bit 108a and halt the AES calculation before completion resulting in erroneous output data.

Basic AES Algorithm

The AES algorithm can perform AES operations on a 4×4 matrix referred to as the state where each element of the matrix is one byte (eight bits) of data. The state contains a total of 16 bytes or 128 bits of data. The input array of bytes for encryption or decryption for the AES algorithm is also 128 bits of data organized into a 4×4 matrix. AES operations are performed on the input data using the state to produce output data, which is also in the form of a 4×4 matrix where each element of the matrix is one byte (eight bits). The AES algorithm performs multiple rounds of AES operations on each 128 bit block of data. The number of rounds can be determined based on the size of the cryptographic key. The cryptographic system can divide input data larger than 128 bits into a number of 128 bits of data. These data blocks can be input consecutively into the AES block 102 as shown in FIG. 1.

All AES operations in a round are invertible. The AES block 102 can invert and perform in a reverse order the operations used to perform an encryption of the input data to perform a decryption of the input data.

In an encryption of input data, the AES block 102 can expand the cryptographic key into a key schedule. The AES algorithm can take the key and perform a key expansion routine to generate a key schedule. The key schedule can expand a key into a number of separate keys (sub keys) where the AES block 102 can use the sub keys for each round of the AES algorithm. The sub keys can also be referred to as round keys. The key expansion routine can use AES operations to expand the key where the length of the expanded key can be equal to: block size*number of rounds+1 (e.g., a 128-bit key expands to a 176-byte key, a 192-bit key expands to a 208-byte key, and a 256-bit key expands to 240-byte key). The AES block 102 can use a different part of the expanded key for each round of the AES algorithm. In a decryption of input data, the AES block 102 can use the key schedule to decrypt the input data. The AES block 102 can perform an inverse key schedule operation to generate the cryptographic key used to encrypt the input data.

Implementation of an AES Block using Key Recovery

Figure 2:
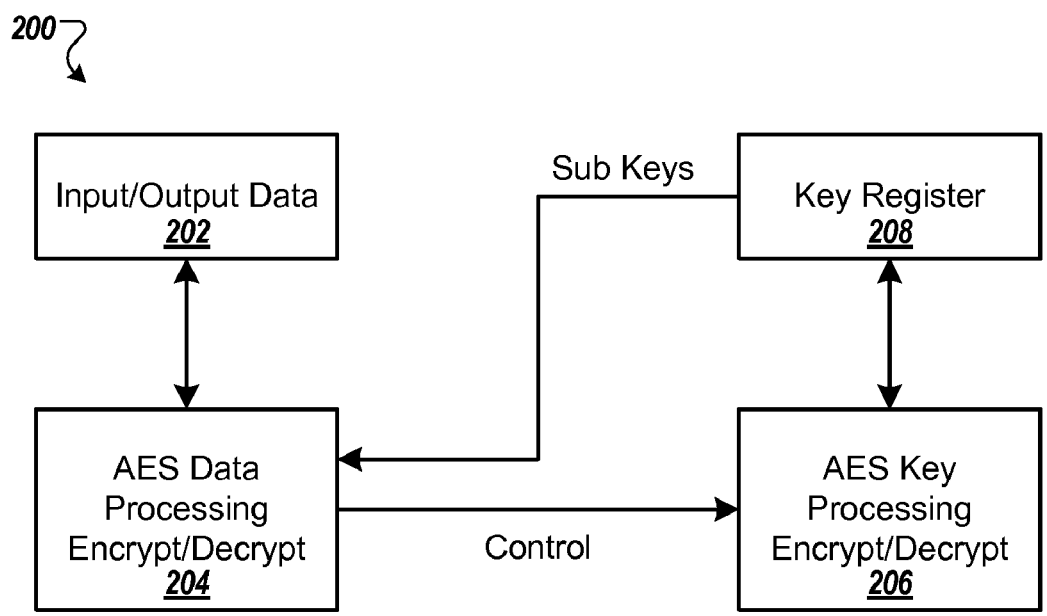
FIG. 2 is a block diagram of an example implementation of an AES system included in an Advanced Encryption Standard (AES) block.

FIG. 2 is a block diagram of an implementation of an AES system 200 included in the Advanced Encryption Standard (AES) block 102 of FIG. 1. The system 200 can perform AES operations for encryption or decryption of a 128 bit block of input data using key recovery. Once the encryption or decryption of the 128 bit block of input data is complete, the result is output to the AES cipher engine 100 and the system 200 can receive the input data for the next 128 bit block of data to encrypt or decrypt.

As shown in FIG. 2, the system 200 includes an input/output data block 202. The input/output data block 202 can provide a 128 bit input data block for encryption or decryption to an AES data processing encrypt/decrypt block 204. The input/output data block 202 can also receive the resultant encrypted or decrypted 128 bit output data block from the AES data processing encrypt/decrypt block 204. The data processing encrypt/decrypt block 204 can perform AES operations on each 128 bit block of data received by the input/output data block 202.

Prior to the start of data encryption or decryption using the AES cipher engine 100, the cryptographic system can load a cryptographic key into the key registers 112, as shown in FIG. 1. Prior to the start of the encryption or decryption of the first 128 bit input data block, the key registers 112 can be loaded into key register block 208.

When performing data encryption or decryption, an AES key processing encrypt/decrypt block 206 can perform a key expansion routine using a cryptographic key to generate a key schedule. The key register block 208 can initially store the cryptographic key prior to the start of any AES encryption operations. The key register block 208 can be large enough to buffer the entire key (e.g., 256 bits or 32 bytes (e.g., key registers 112)) where the key can be 128, 192, or a maximum of 256 bits.

During encryption or decryption operations on a first 128 bit input data block in the system 200, the initial cryptographic key loaded into the key register block 208 from the key registers 112 can be overwritten. The registers containing the key value can be used as a workspace when performing the cipher operations. Before performing subsequent encryption or decryption operations on the next 128 bit input data block, the system 200 can restore the cryptographic key into the key register block 208.

Implementations of Different Key Register Blocks and Key Schedule Operations

In some implementations, before each 128 bit input data block encryption or decryption operation, the AES cipher system 100 can load the key registers 112 into the register block 208. This implementation can require handling the cryptographic key once for every 128 bit block of data processed. This can result in a large number of manipulations of the cryptographic key for a large block of data. Additionally, in some implementations, the system 200 can check the integrity of the cryptographic key each time it is loaded from the key registers 112 into the register block 208. This can increase the computation throughput of the AES cipher engine 100.

In some implementations, the system 100 can store two copies of the cryptographic key in the key register block 208. One copy of the key can be saved and used to restore another copy of the key that can be overwritten during workspace calculations while performing encryption or decryption operations. This implementation can require additional registers in the key register block 208 for storing the cryptographic key, increasing the gate count of the key register block 208. This increases the gate count of the integrated processor that includes the AES cipher engine 100. The increased gate count can increase the footprint of the integrated processor as well as increase its energy consumption.

In some implementations, the system 200 can restore the cryptographic key into the key register block 208 after the system 200 performs an encryption of a first 128 bit input data block. The system 200 can perform a key recovery operation that uses an inverse key schedule on the key schedule used to encrypt the first 128 bit input data block to recover the cryptographic key needed for encrypting the next 128 bit input data block. The generating of a key schedule and its use for encrypting the 128 bit input data block results in altering the key data such that the initial cryptographic key value is no longer available to the system 200. The system 200 can perform the key recovery operation after the first 128 bit input data block is encrypted and prior to encrypting the next 128 bit input data block. The system 200 can store the recovered key in the key register block 208 in the same registers that held the initial cryptographic key received from the key registers 112. The system 200 can overwrite any data contained in these registers that may have been used as a workspace for the encryption operations as the first 128 bit input data block has already been encrypted and output to the output data block 202.

In some implementations, the system 200 can restore the key schedule into the key register block 208 after the system 200 performs a decryption of a first 128 bit input data block. A decryption can use the same AES operations an encryption uses. However, the operations are inverted and then implemented in a reverse order. The decryption of a first 128 bit input data block starts with an initial key schedule. An inverse key schedule operation can determine the original cryptographic key used for encrypting the original data. The inverse key schedule operation and its use in decrypting the 128 bit input data block can result in altering the key schedule data such that the initial key schedule data is no longer available to the system 200. The system 200 can perform a key recovery operation after the first 128 bit input data block is decrypted and prior to decrypting the next 128 bit input data block. The key recovery operation performs a key schedule operation by running a key expansion operation on the resulting cryptographic key to generate and restore the key schedule. The system 200 can store the recovered key schedule in the key register block 208 in the same registers that held the initial key schedule. The system 200 can overwrite any data contained in these registers that may have been used as a workspace for the decryption as the first 128 bit input data block has already been decrypted and output to the output data block 202.

The key recovery operation can increase the computation throughput of the AES cipher engine 100. However, the AES block 102 does not require the engine 100 to load the key registers 112 into the key register block 208 in order to restore the cryptographic key resulting in fewer key manipulations and computations as the system 200 can check the integrity of the key value each time it is loaded into the system 200. Additionally, fewer gates may be needed in the key register block 208 as fewer registers are used because the cryptographic key is not also saved in the key register block 208.

In some implementations, the AES cipher engine 100 in FIG. 1 can be an integrated processor included in a cryptographic system that may include additional integrated processors for performing specific operations in the cryptographic system. It may be desirable to minimize the footprint of the engine 100 to help minimize the footprint of the cryptographic system. Reducing the number of registers needed for key storage in the system 200 included in the AES block 102 in the engine 100 can help to reduce the size of the integrated processor and the size of the cryptographic system as a whole.

AES Operation Register

Figure 3A:
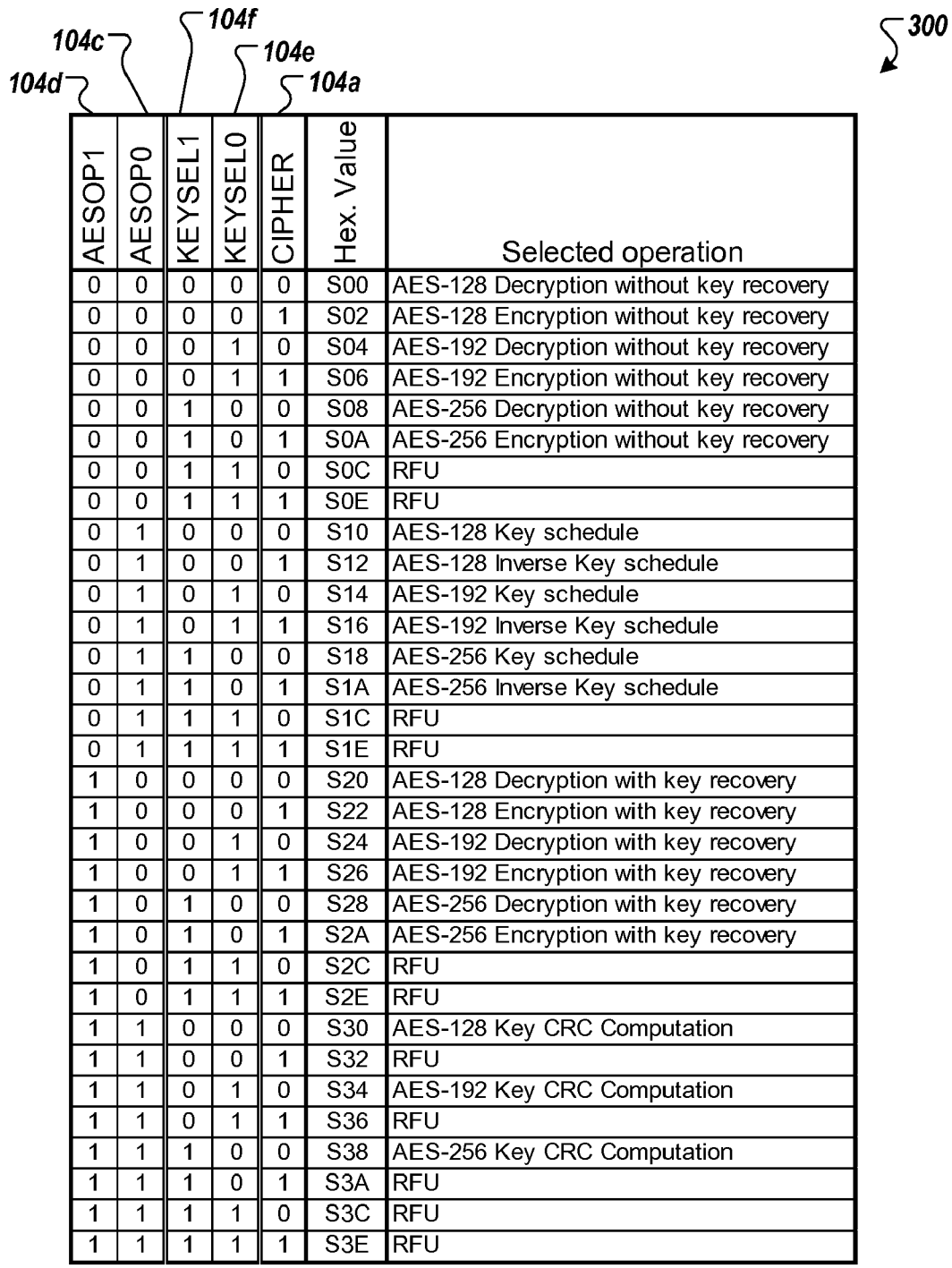
FIG. 3A is a table showing the bits in an Advanced Encryption Standard (AES) operation register and the operations associated with the bit values.

FIG. 3A is a table 300 showing the bits in an Advanced Encryption Standard (AES) operation register and the operations associated with the bit values. Referring to FIG. 1, the AES operation register (AESOP) includes AES operation bits 104c, 104d (AESOP0 and AESOP1, respectively), AES key select bits 104e, 104f (KEYSEL0 and KEYSEL1, respectively) and AES cipher bit 104a (CIPHER).

The AES operation bits 104c, 104d can select one of a possible four AES operations to launch when the AES start bit 104b is set equal to one: a cipher operation with key recovery, a cipher operation without key recovery, a key schedule operation, or a CRC computation. The AES cipher bit 104a can select between encryption and decryption operations. The AES key select bits 104e, 104f can select one of three possible input sizes for an input cryptographic key: 128, 192, or 256 bits.

Clearing (setting equal to zero) both AES operation bits 104c, 104d selects an operation without key recovery. Additionally, clearing (setting equal to zero) both AES key select bits 104e, 104f selects an AES operation without key recovery that uses a 128 bit key. The clearing (setting equal to zero) or setting equal to one of the AES cipher bit 104a determines whether the operation will be a decryption or an encryption, respectively.

Clearing (setting equal to zero) both AES operation bits 104c, 104d selects an operation without key recovery. Additionally, setting the AES key select bit 104e equal to one and clearing (setting equal to zero) the AES key select bit 104f selects an AES operation without key recovery that uses a 192 bit key. The clearing (setting equal to zero) or setting equal to one of the AES cipher bit 104a determines whether the operation will be a decryption or an encryption, respectively.

Clearing (setting equal to zero) both AES operation bits 104c, 104d selects an operation without key recovery. Additionally, clearing (setting equal to zero) the AES key select bit 104e and setting equal to one the AES key select bit 104f selects an AES operation without key recovery that uses a 256 bit key. The clearing (setting equal to zero) or setting equal to one of the AES cipher bit 104a determines whether the operation will be a decryption or an encryption, respectively.

Clearing (setting equal to zero) AES operation bit 104d and setting AES operation bit 104c equal to one selects a key schedule operation. Additionally, clearing (setting equal to zero) both AES key select bits 104e, 104f selects a key schedule operation that uses a 128 bit key. The clearing (setting equal to zero) or setting equal to one of the AES cipher bit 104a determines whether the key schedule operation will be a key schedule or an inverse key schedule operation, respectively.

Clearing (setting equal to zero) AES operation bit 104d and setting AES operation bit 104c equal to one selects a key schedule operation. Additionally, setting the AES key select bit 104e equal to one and clearing (setting equal to zero) the AES key select bit 104f selects a key schedule operation that uses a 192 bit key. The clearing (setting equal to zero) or setting equal to one of the AES cipher bit 104a determines whether the key schedule operation will be a key schedule or an inverse key schedule operation, respectively.

Clearing (setting equal to zero) AES operation bit 104d and setting AES operation bit 104c equal to one selects a key schedule operation. Additionally, clearing (setting equal to zero) the AES key select bit 104e and setting equal to one the AES key select bit 104f selects a key schedule operation that uses a 256 bit key. The clearing (setting equal to zero) or setting equal to one of the AES cipher bit 104a determines whether the key schedule operation will be a key schedule or an inverse key schedule operation, respectively.

Clearing (setting equal to zero) AES operation bit 104c and setting AES operation bit 104d equal to one selects an operation with key recovery. Additionally, clearing (setting equal to zero) both AES key select bits 104e, 104f selects an AES operation with key recovery that uses a 128 bit key. The clearing (setting equal to zero) or setting equal to one of the AES cipher bit 104a determines whether the operation will be a decryption or an encryption, respectively.

Clearing (setting equal to zero) AES operation bit 104c and setting AES operation bit 104d equal to one selects an operation with key recovery. Additionally, setting the AES key select bit 104*e* equal to one and clearing (setting equal to zero) the AES key select bit 104*f* selects an AES operation with key recovery that uses a 192 bit key. The clearing (setting equal to zero) or setting equal to one of the AES cipher bit 104*a* determines whether the operation will be a decryption or an encryption, respectively.

Clearing (setting equal to zero) AES operation bit 104*c* and setting AES operation bit 104*d* equal to one selects an operation with key recovery. Additionally, clearing (setting equal to zero) the AES key select bit 104*e* and setting equal to one the AES key select bit 104*f* selects an AES operation with key recovery that uses a 256 bit key. The clearing (setting equal to zero) or setting equal to one of the AES cipher bit 104*a* determines whether the operation will be a decryption or an encryption, respectively.

Setting both AES operation bits 104*c*, 104*d* equal to one selects a key CRC computation. Additionally, clearing (setting equal to zero) both AES key select bits 104*e*, 104*f* and clearing (setting equal to zero) the AES cipher bit 104*a* selects an AES-128 key CRC operation.

Setting both AES operation bits 104*c*, 104*d* equal to one selects a key CRC computation. Additionally, setting the AES key select bit 104*e* equal to one, clearing (setting equal to zero) the AES key select bit 104*f* and clearing (setting equal to zero) the AES cipher bit 104*a* selects an AES-192 key CRC operation.

Setting both AES operation bits 104*c*, 104*d* equal to one selects a key CRC computation. Additionally, clearing (setting equal to zero) AES key select bit 104*e*, setting the AES key select bit 104*f* equal to one and clearing (setting equal to zero) the AES cipher bit 104*a* selects an AES-256 key CRC operation.

AES Computation Timings

FIG. 3B is a table 350 showing the execution times 352 (in central processing unit (CPU) cycles) for AES operations 354 selected using the AES operation register. Table 300 in FIG. 3A shows the values for the bits of the AES operation register used to select the AES operations 354.

In general, AES operations that use larger cryptographic keys require more CPU cycles to complete. AES operations that use key recovery also use more CPU cycles. However, the increase in CPU cycles can be offset by the decrease in the number of key registers needed to store the cryptographic key reducing the size of the integrated processor. In addition, key recovery reduces the amount of unnecessary manipulation of the cryptographic key reducing security problems in the cryptographic system.

AES Key State Diagram

Figure 4:
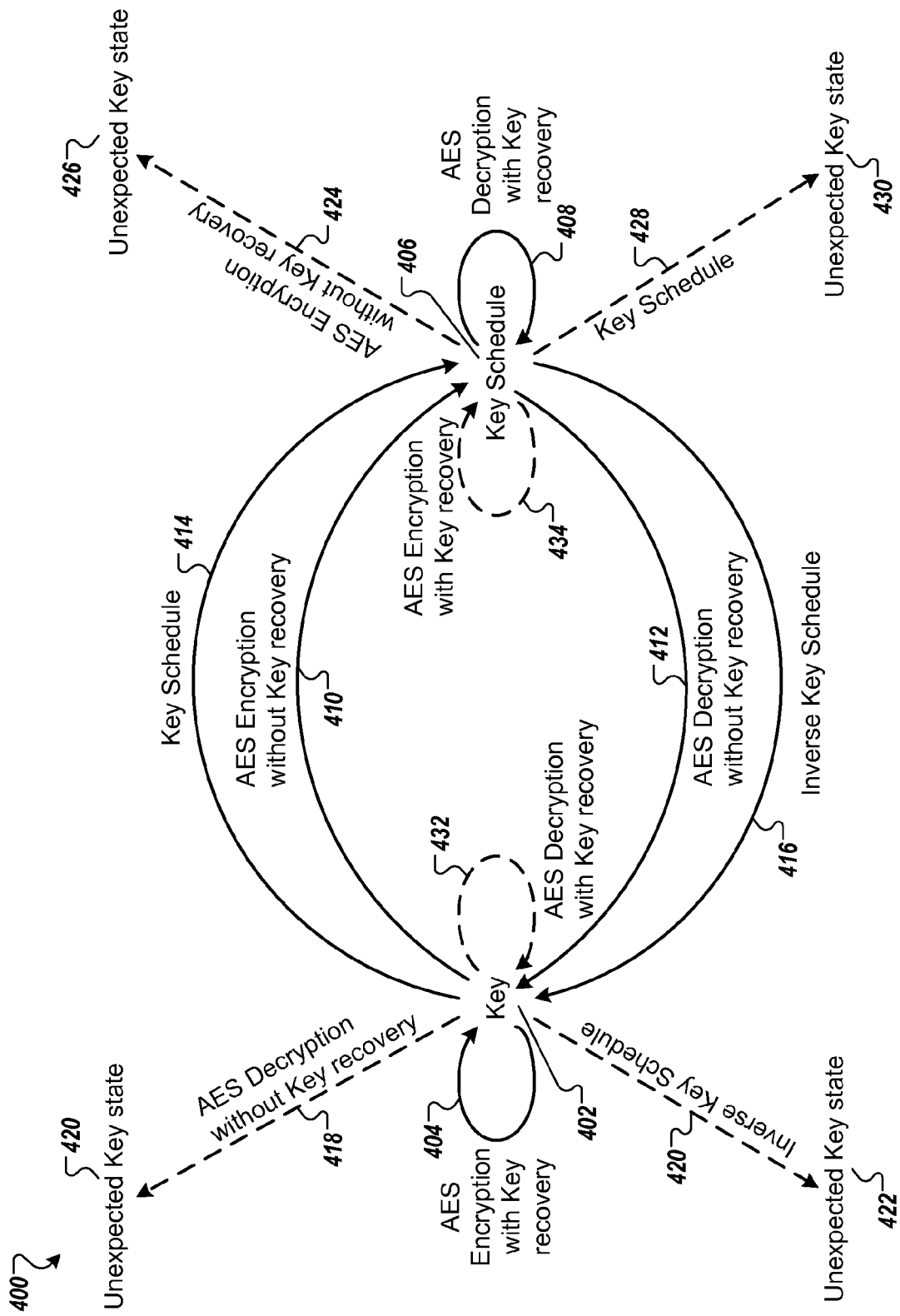
FIG. 4 is a state diagram showing example Advanced Encryption Standard (AES) key states in an AES block.

FIG. 4 is a state diagram 400 showing example Advanced Encryption Standard (AES) key states in an AES block (e.g., AES block 102 in FIG. 1). The diagram 400 shows possible key states and key values for an AES cryptographic key used in encryption and decryption. The diagram 400 shows a link between the ways the key can evolve and the operations executed by the AES block. The AES operations shown in FIG. 4 can be AES operations selected by the bits in the Advanced Encryption Standard (AES) operation register shown in FIG. 3 and executed by the AES system 200 in FIG. 2 included in the AES block 102.

The interconnecting lines show AES operations. The solid lines show operations that are compliant with the FIPS-197 AES Standard. The dotted lines show operations that are non-compliant with the FIPS-197 AES standard that may involve an unusual usage of the AES operations.

When the AES block is in a key state 402, performing an AES encryption operation with key recovery 404 can return the AES block to the key state 402. When the AES block is in a key schedule state 406, performing an AES decryption operation with key recovery 408 can return the AES block to the key schedule state 404.

When the AES block is in the key state 402, performing an AES encryption operation without key recovery 410 can put the AES block in the key schedule state 406. When the AES block is in the key schedule state 406, performing an AES decryption operation without key recovery 412 can put the AES block into the key schedule state 402.

When the AES block is in the key state 402, performing a key schedule operation 414 can put the AES block in the key schedule state 402. When the AES block is in the key schedule state 406, performing an inverse key schedule operation 416 can put the AES block in the key schedule state 406.

Non-compliant operations can result in the AES block transitioning into unexpected states. When the AES block is in the key state 402, performing an AES decryption operation without key recovery 418 can put the AES block into an unexpected key state 420. When the AES block is in the key state 402, performing an inverse key schedule operation 420 can put the AES block into an unexpected key state 422. When the AES block is in the key state 402, performing an AES decryption operation with key recovery 432 can put the AES block into the key state 402. However, an AES decryption operation uses a key schedule as its input key therefore, the AES block will not likely perform this operation.

When in the key schedule state 406, performing an AES encryption operation without key recovery 424 can put the AES block into an unexpected key state 426. When in the key schedule state 406, performing a key schedule operation 428 can put the AES block into an unexpected key state 430. When the AES block is in the key schedule state 406, performing an AES encryption operation with key recovery 434 can put the AES block into the key schedule state 402. However, an AES encryption operation uses a key as its input key therefore, the AES block will not likely perform this operation.

Implementation of an Encryption Process

Figure 5:
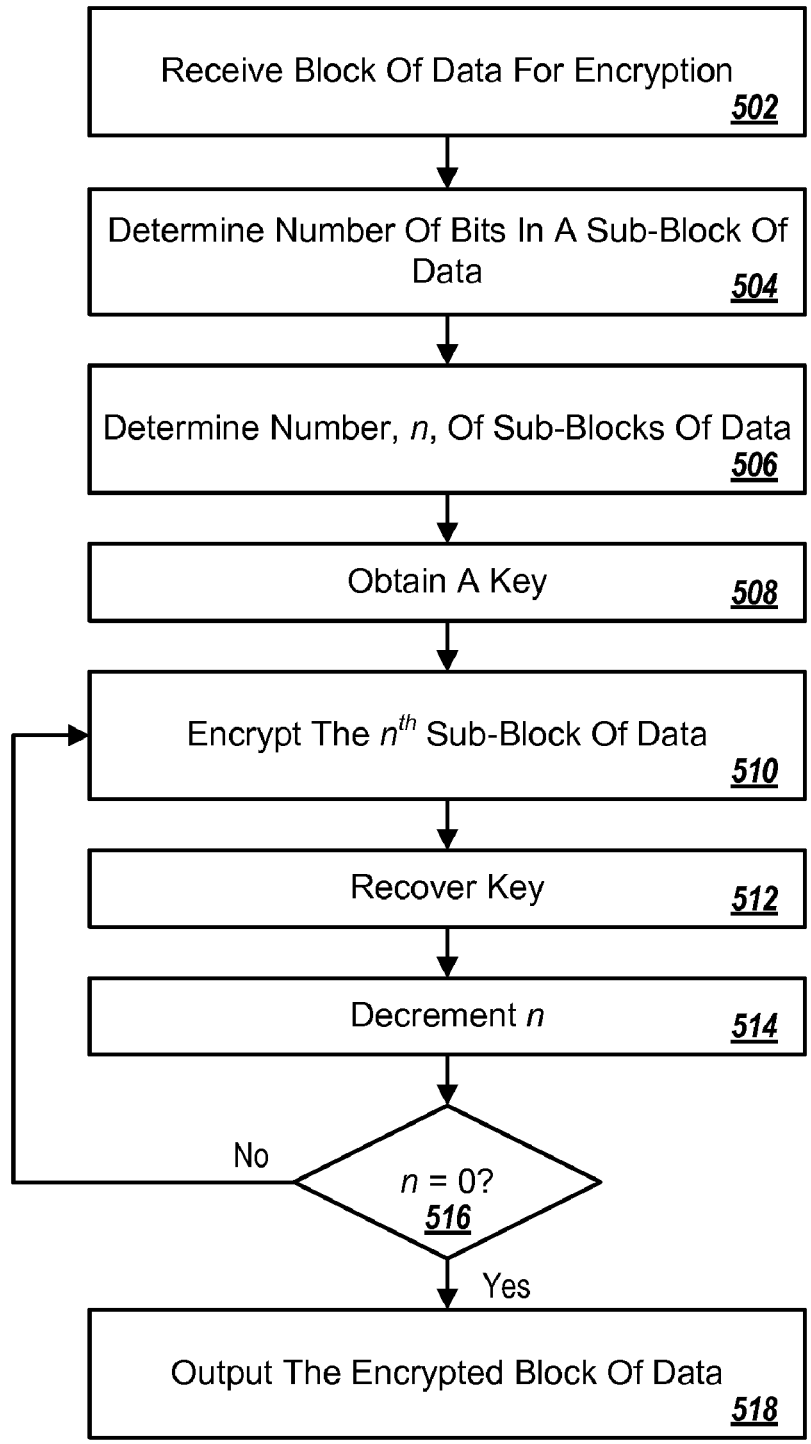
FIG. 5 is a flow diagram of an example implementation of an encryption process in a cryptographic system.

FIG. 5 is a flow diagram of an implementation of an encryption process 500 in a cryptographic system. The cryptographic system can include the AES cipher engine 100, shown in FIG. 1. The encryption process can use the AES algorithm as described in FIGS. 1-4.

The process 500 begins with the cryptographic system receiving a block of data for encryption (step 502). The cryptographic system determines the number of bits included in a sub-block of data where the size of the sub-block of data is smaller than the size of the received block of data (step 504). For example, as described with reference to FIG. 1, a sub-block of data for use in an AES algorithm can be 128 bits. The input block of data can be divided into a number of sub-blocks of data where each sub-block of data is 128 bits. The cryptographic system determines the number of 128 bit blocks of data, n, included in the input block of data (step 506). Next, the cryptographic system obtains a cryptographic key (step 508). The cryptographic system uses the AES algorithm and the cryptographic key to encrypt the nth 128 bit sub-block of data (step 510). For example, the AES cipher engine 100 included in the cryptographic system can encrypt the $n^{th}$ 128 bit sub-block of data.

The cryptographic system uses a key recovery operation to recover the cryptographic key (step 512). For example, the AES block 102 in the AES cipher engine 100 in the cryptographic system can include a key recovery operation to recover the key for use in the next sub-block encryption. The cryptographic system can decrement the number of sub-blocks of data (step 514). If there are remaining sub-blocks of data to encrypt (n is not equal to zero in step 516), the process 500 continues to step 510. The cryptographic system then encrypts another sub-block of data using the key recovered in step 512. If there are no remaining sub-blocks of data to encrypt (n is equal to zero in step 516), the cryptographic system can output the encrypted block of received data (step 518). The process 500 ends.

In some implementations, the process 500 can encrypt the sub-blocks of data starting with the first sub-block and ending with the nth sub-block where the input block of data includes n sub-blocks.

Implementation of a Decryption Process

Figure 6:
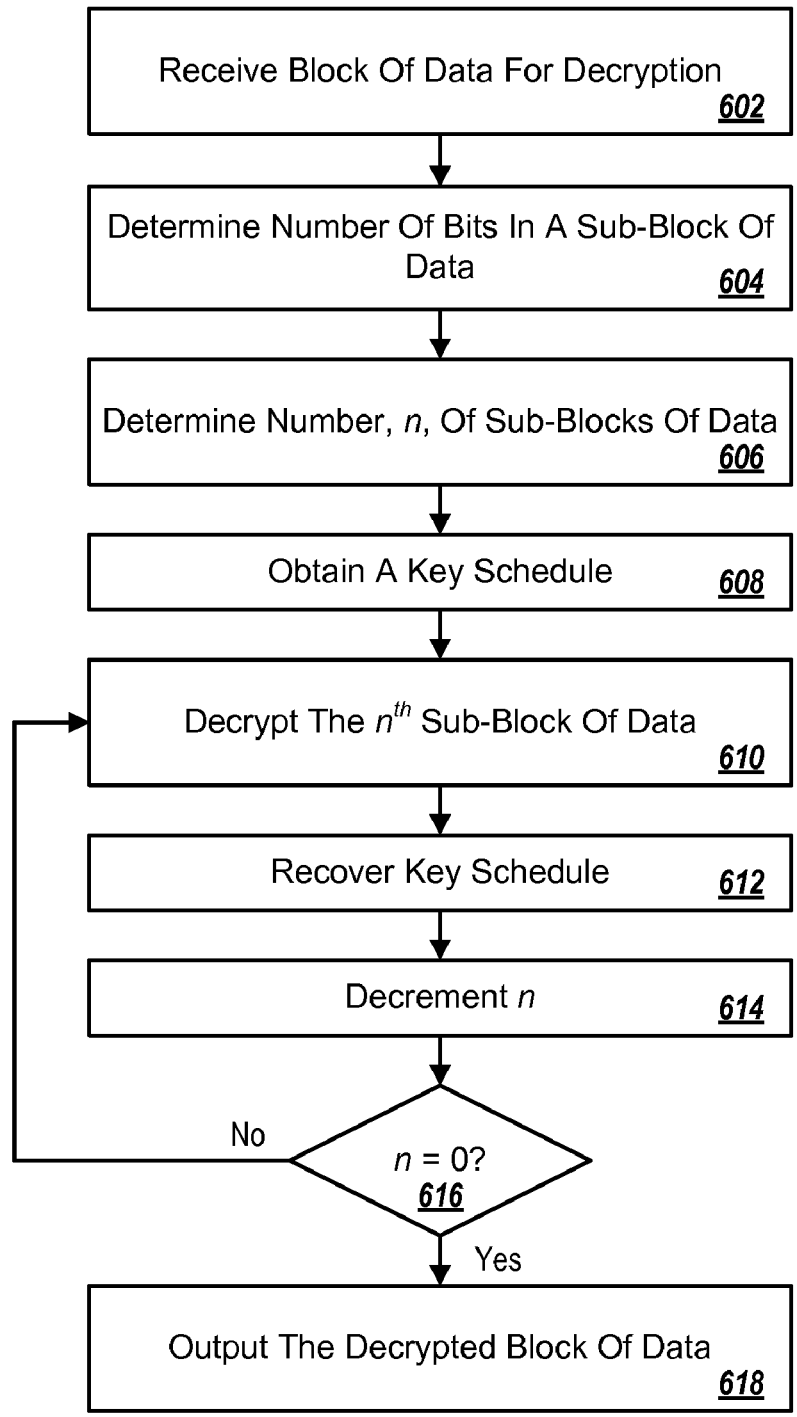
FIG. 6 is a flow diagram of an example implementation of a decryption process in a cryptographic system.

FIG. 6 is a flow diagram of an implementation of an decryption process 600 in a cryptographic system. The cryptographic system can include the AES cipher engine 100, shown in FIG. 1. The decryption process can use the AES algorithm as described in FIGS. 1-4.

The process 600 begins with the cryptographic system receiving a block of data for decryption (step 602). The cryptographic system determines the number of bits included in a sub-block of data where the size of the sub-block of data is smaller than the size of the received block of data (step 604). For example, as described with reference to FIG. 1, a sub-block of data for use in an AES algorithm can be 128 bits. The input block of data can be divided into a number of sub-blocks of data where each sub-block of data is 128 bits. The cryptographic system determines the number of 128 bit blocks of data, n, included in the input block of data (step 606). Next, the cryptographic system obtains a key schedule (step 608). The cryptographic system uses the AES algorithm and the key schedule to decrypt the $n^{th}$ 128 bit sub-block of data (step 610). For example, the AES cipher engine 100 included in the cryptographic system can decrypt the nth 128 bit sub-block of data.

The cryptographic system uses an inverse key recovery operation to recover the key schedule (step 612). For example, the AES block 102 in the AES cipher engine 100 in the cryptographic system can include an inverse key recovery operation to recover the key schedule for use in the next sub-block decryption. The cryptographic system can decrement the number of sub-blocks of data (step 614). If there are remaining sub-blocks of data to decrypt (n is not equal to zero in step 616), the process 600 continues to step 610. The cryptographic system then decrypts another sub-block of data using the key recovered in step 612. If there are no remaining sub-blocks of data to decrypt (n is equal to zero in step 616), the cryptographic system can output the decrypted block of received data (step 618). The process 600 ends.

In some implementations, the process 600 can decrypt the sub-blocks of data starting with the first sub-block and ending with the $n^{th}$ sub-block where the input block of data includes n sub-blocks.

System Architecture

Figure 7:
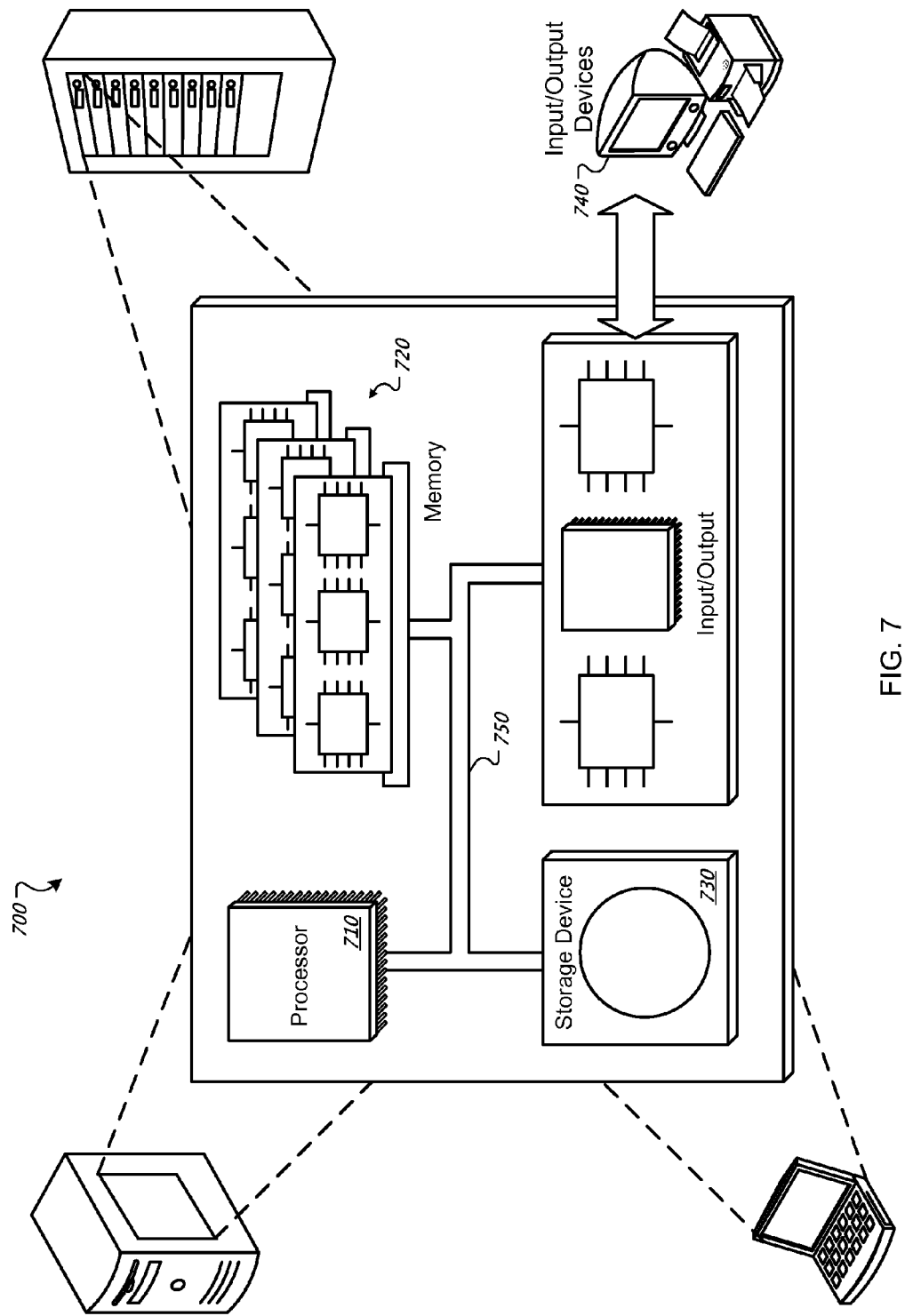
FIG. 7 is a block diagram of an example implementation of a system that can include a cryptographic system.

FIG. 7 is a block diagram of an implementation of a system that can include a cryptographic system that can include an Advanced Encryption Standard (AES) cipher engine as described in FIG. 1. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In some implementations, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. In other implementations, the memory 720 is a volatile memory unit. In yet other implementations, the memory 720 is a non-volatile memory unit.

The storage device 730 is capable of providing mass storage for the system 700. In some implementations, the storage device 730 is a computer-readable medium. In various different implementations, the storage device 730 may be a floppy disk device, a hard disk device, an optical disk device, or a tape device.

The input/output device 740 provides input/output operations for the system 700. In some implementations, the input/output device 740 includes a keyboard and/or pointing device. In other implementations, the input/output device 740 includes a display unit for displaying graphical user interfaces.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A cryptographic system, comprising:
a register containing key data for a key;
an input/output data block containing data for encryption;
a processor coupled to the register and the input/output data block, operable for:
  receiving the data from the input/output data block, the data comprising a first sub-block of a block of data, wherein the number of bits in the first sub-block of data is less than or equal to the total number of bits in the block of data;
  performing a first encrypting operation on the first sub-block of data, the encrypting operation including computing a key schedule using the register as a workspace, wherein the computing overwrites the key data for the key resulting in the register containing data other than the key data for the key;
  at the end of the first encrypting operation on the first sub-block of data:
    computing an inverse key schedule for the key schedule used in the first encrypting operation to recover the key data for the key; and
    restoring the recovered key data for the key to the register, wherein the restoring overwrites the data other than the key data for the key in the register;
  receiving, from the input/output data block, data comprising a second sub-block of the block of data, wherein the number of bits in the second sub-block of data is equal to the number of bits in the first sub-block of data; and
  performing a second encrypting operation on the second sub-block of data using the recovered key data for the key.

2. A cryptographic system, comprising:
a register containing key schedule data;
an input/output data block containing data for decryption;
a processor coupled to the register and the input/output data block, operable for:
  receiving the data from the input/output data block, the data comprising a first sub-block of a block of data, wherein the number of bits in the first sub-block of data is less than or equal to the total number of bits in the block of data;
  performing a first decrypting operation on the first sub-block of data, the decrypting operation including computing an inverse key schedule using the register as a workspace, wherein the computing overwrites the key schedule data resulting in the register containing data other than the key schedule data, the data comprising a key;
  at the end of the first decrypting operation on the first sub-block of data:
    performing a key expansion operation on the key to recover the key schedule data; and
    restoring the recovered key schedule data to the register, wherein the restoring overwrites the data other than the key schedule data in the register;
  receiving, from the input/output data block, data comprising a second sub-block of the block of data, wherein the number of bits in the second sub-block of data is equal to the number of bits in the first sub-block of data; and
  performing a second decrypting operation on the second sub-block of data using the recovered key schedule data.

3. A method for encrypting data in a cryptographic system, the method comprising:
receiving a block of data for encryption;
determining a number of bits in a sub-block of data, wherein the number of bits in a sub-block of data is less than or equal to the number of bits in the block of data;
determining a plurality of sub-blocks of data that comprise the block of data;
obtaining key data for a key, the key data contained in a register;
performing an encryption operation on a first sub-block of data, wherein the encryption operation comprises:
  computing a key schedule using the register as a workspace, wherein the computing overwrites the key data for the key resulting in the register containing data other than the key data for the key;
  at the end of the encryption operation on the first sub-block of data:
    computing an inverse key schedule for the key schedule used in the first encrypting operation to recover the key data for the key; and restoring the recovered key data for the key to the register, wherein the restoring overwrites the data other than the key data for the key in the register; and performing the encryption operation on a second sub-block of data using the recovered key data for the key.

4. The method of claim 3, where the number of bits is 128.

5. A method for decrypting data in a cryptographic system, the method comprising:
receiving a block of data for decryption;
determining a number of bits in a sub-block of data, wherein the number of bits in a sub-block of data is less than or equal to the number of bits in the block of data;
determining a plurality of sub-blocks of data that comprise the block of data;
obtaining key schedule data, the key schedule data contained in a register;
performing a decryption operation on a first sub-block of data, wherein the decryption operation comprises:
computing an inverse key schedule using the register as a workspace, wherein the computing overwrites the key schedule data resulting in the register containing data other than the key schedule data, the data comprising a key;
at the end of the decryption operation on the first sub-block of data:
performing a key expansion operation on the key to recover the key schedule data; and
restoring the recovered key schedule data to the register, wherein the restoring overwrites the data other than the key schedule data in the register; and
performing the decryption operation on a second sub-block of data using the recovered key schedule data.

6. The method of claim 5, where the number of bits is 128.

7. A system for encrypting data in a cryptographic system, the system comprising:
an interface operable for receiving a block of data for encryption; and
a processor coupled to the interface, the processor operable for:
determining a number of bits in a sub-block of data, wherein the number of bits in a sub-block of data is less than or equal to the number of bits in the block of data;
determining a plurality of sub-blocks of data that comprise the block of data;
obtaining key data for a key, the key data contained in a register;
performing an encryption operation on a first sub-block of data, wherein the encryption operation comprises:
computing a key schedule using the register as a workspace, wherein the computing overwrites the key data for the key resulting in the register containing data other than the key data for the key;
at the end of the encryption operation on the first sub-block of data:
computing an inverse key schedule for the key schedule used in the first encrypting operation to recover the key data for the key; and
restoring the recovered key data for the key to the register, wherein the restoring overwrites the data other than the key data for the key in the register; and
performing the encryption operation on a second sub-block of data using the recovered key.

8. The system of claim 7, where the number of bits is 128.

9. A system for decrypting data in a cryptographic system, the system comprising:
an interface operable for receiving a block of data for decryption; and
a processor operatively coupled to the interface, the processor operable for:
determining a number of bits in a sub-block of data, wherein the number of bits in a sub-block of data is less than or equal to the number of bits in the block of data;
determining a plurality of sub-blocks of data that comprise the block of data;
obtaining key schedule data, the key schedule data contained in a register;
performing a decryption operation on a first sub-block of data, wherein the decryption operation comprises:
computing an inverse key schedule using the register as a workspace, wherein the computing overwrites the key schedule data resulting in the register containing data other than the key schedule data, the data comprising a key;
at the end of the decryption operation on the first sub-block of data:
performing a key expansion operation on the key to recover the key schedule data; and
restoring the recovered key schedule data to the register, wherein the restoring overwrites the data other than the key schedule data in the register; and
performing the decryption operation on a second sub-block of data using the recovered key schedule.

10. The system of claim 9, where the number of bits is 128.

11. The system of claim 1, further comprising:
an operation register including one or more bits, wherein before performing the first encrypting operation the one or more bits are set for an encryption operation with key recovery.

12. The system of claim 2, further comprising:
an operation register including one or more bits, wherein before performing the first decrypting operation the one or more bits are set for a decryption operation with key recovery.

13. The method of claim 3, further comprising:
determining, before performing the encryption operation on the first sub-block of data, that one or more bits included in an operation register are set for an encryption operation with key recovery.

14. The method of claim 5, further comprising:
determining, before performing the decryption operation on the first sub-block of data, that one or more bits included in an operation register are set for a decryption operation with key recovery.

15. The system of claim 7, wherein:
before performing the encryption operation on the first sub-block of data, determining that one or more bits included in an operation register are set for an encryption operation with key recovery.

16. The system of claim 9, wherein:
before performing the decryption operation on the first sub-block of data, determining that one or more bits included in an operation register are set for a decryption operation with key recovery.

17. The system of claim 1, wherein:
performing a first encrypting operation on a first sub-block of data results in an encrypted first sub-block of data, and wherein the processor is further operable for:

providing the resultant encrypted first sub-block of data to the input/output data block.

18. The system of claim 2, wherein:
performing a first decrypting operation on a first sub-block of data results in a decrypted first sub-block of data, and wherein the processor is further operable for:
providing the resultant decrypted first sub-block of data to the input/output data block.

19. The method of claim 3, wherein performing an encryption operation on a first sub-block of data results in an encrypted first sub-block of data, and wherein the method further comprises:
providing the resultant encrypted first sub-block of data to one or more output data registers before performing the encryption operation on the second sub-block of data using the recovered key data for the key.

20. The method of claim 5, wherein performing a decryption operation on a first sub-block of data results in a decrypted first sub-block of data, and wherein the method further comprises:
providing the resultant decrypted first sub-block of data to one or more output data registers before performing the decryption operation on the second sub-block of data using the recovered key schedule data.

21. The system of claim 7, wherein performing an encryption operation on a first sub-block of data results in an encrypted first sub-block of data, and wherein the processor is further operable for:
providing the resultant encrypted first sub-block of data to one or more output data registers before performing the encryption operation on the second sub-block of data using the recovered key.

22. The system of claim 9, wherein performing a decryption operation on a first sub-block of data results in a decrypted first sub-block of data, and wherein the processor is further operable for:
providing the resultant decrypted first sub-block of data to one or more output data registers before performing the decryption operation on the second sub-block of data using the recovered key schedule.

* * * * *